United States Patent
Heuft

(10) Patent No.: US 10,259,663 B2
(45) Date of Patent: Apr. 16, 2019

(54) TRANSPORTER HAVING PARALLEL AND HEIGHT-ADJUSTABLE TRANSPORTING DEVICES

(71) Applicant: HEUFT SYSTEMTECHNIK GMBH, Burgbrohl (DE)

(72) Inventor: Bernhard Heuft, Burgbrohl (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 15/570,512

(22) PCT Filed: May 2, 2016

(86) PCT No.: PCT/EP2016/059790
§ 371 (c)(1),
(2) Date: Oct. 30, 2017

(87) PCT Pub. No.: WO2016/174270
PCT Pub. Date: Nov. 3, 2016

(65) Prior Publication Data
US 2018/0155134 A1    Jun. 7, 2018

(30) Foreign Application Priority Data
Apr. 30, 2015   (DE) .................. 10 2015 005 617

(51) Int. Cl.
*B65G 15/12*     (2006.01)
*B65G 21/10*     (2006.01)
(Continued)

(52) U.S. Cl.
CPC ........... *B65G 47/268* (2013.01); *B65G 15/12* (2013.01); *B65G 21/10* (2013.01);
(Continued)

(58) Field of Classification Search
CPC ..................... B65G 47/268; B65G 47/8869
(Continued)

(56) References Cited

U.S. PATENT DOCUMENTS

| 2,096,772 A | 10/1937 | Webster |
| 2,184,905 A | 12/1939 | Brintnall |

(Continued)

FOREIGN PATENT DOCUMENTS

| DE | 16 11 850 A1 | 1/1971 |
| DE | 79 03 738 U1 | 6/1979 |

(Continued)

OTHER PUBLICATIONS

English translation of International Preliminary Report on Patentability issued in related application PCT/EP2016/059790, dated Nov. 9, 2017, 7 pages.

(Continued)

*Primary Examiner* — Douglas A Hess
(74) *Attorney, Agent, or Firm* — Drinker Biddle & Reath LLP

(57) ABSTRACT

A device for transporting objects, such as containers, bottles, multipacks and packaged items, comprising a first transporting device having a first conveying speed, at least a second transporting device which is arranged in parallel to the first transporting device and has a second conveying speed, wherein the first and the at least one second transporting device form with each other a substantially closed transport surface and have the same conveying direction, and at least one lifting device, by which at least one of the transporting devices is height-adjustable so that at least a portion of a transport surface of the at least one transporting device can be raised and lowered above and/or below a transport surface of the other transporting device.

9 Claims, 12 Drawing Sheets

(51) Int. Cl.
*B65G 47/26* (2006.01)
*B65G 47/88* (2006.01)

(52) U.S. Cl.
CPC .. *B65G 47/8869* (2013.01); *B65G 2201/0235* (2013.01); *B65G 2201/0244* (2013.01); *B65G 2811/0631* (2013.01)

(58) Field of Classification Search
USPC ....... 198/575, 577, 586, 604, 606, 607, 620, 198/817
See application file for complete search history.

(56) References Cited

U.S. PATENT DOCUMENTS

| | | | |
|---|---|---|---|
| 2,731,130 A | | 1/1956 | Blickenderfer, Jr. |
| 3,217,859 A | | 11/1965 | Bartlo et al. |
| 3,650,376 A | | 3/1972 | Burgis et al. |
| 3,880,276 A | | 4/1975 | Willett, III |
| 3,930,573 A | | 1/1976 | Wyman |
| 4,591,044 A | * | 5/1986 | Ogami .................. B23Q 7/006 198/346.3 |
| 4,730,718 A | | 3/1988 | Fazio et al. |
| 5,004,094 A | * | 4/1991 | Brandt .................. B65G 43/08 198/460.1 |
| 5,421,446 A | * | 6/1995 | Koch .................. B65G 47/647 198/369.7 |
| 5,437,360 A | | 8/1995 | Eberhard |
| 5,810,158 A | | 9/1998 | Schiesser et al. |
| 6,012,568 A | * | 1/2000 | Kane .................. B65G 21/10 198/817 |
| 6,845,860 B1 | * | 1/2005 | Walker .................. B65G 47/53 198/433 |
| 7,497,096 B2 | * | 3/2009 | Asai .................. C03B 35/165 193/35 R |
| 7,588,239 B2 | * | 9/2009 | Marcinik ............... B65H 31/40 198/412 |
| 7,909,159 B1 | * | 3/2011 | Zats ....................... B65G 21/10 198/586 |
| 7,942,398 B1 | * | 5/2011 | Marcinik ................ B43M 3/04 198/626.5 |
| 9,694,982 B2 | * | 7/2017 | Haas ..................... B65G 15/00 |
| 9,731,848 B2 | * | 8/2017 | Suzuki .................. B65B 5/045 |
| 2003/0019721 A1 | | 1/2003 | Greve |

FOREIGN PATENT DOCUMENTS

| | | |
|---|---|---|
| DE | 36 12 021 A1 | 10/1987 |
| DE | 43 11 519 A1 | 10/1994 |
| DE | 43 30 235 A1 | 3/1995 |
| DE | 43 32 341 A1 | 3/1995 |
| DE | 195 22 264 A1 | 9/1996 |
| DE | 196 36 024 A1 | 3/1998 |
| DE | 198 16 960 A1 | 11/1999 |
| DE | 20 2005 013 125 U1 | 11/2005 |
| EP | 1 002 750 A2 | 5/2000 |
| EP | 2 243 729 A2 | 10/2010 |
| EP | 2 581 331 A1 | 4/2013 |
| FR | 2 340 262 A1 | 9/1977 |
| GB | 333707 A | 8/1930 |
| GB | 1 147 750 A | 4/1969 |
| GB | 1 484 100 A | 8/1977 |

OTHER PUBLICATIONS

European Search Report issued in related application EP 18199435.1, Jan. 28, 2019, 13 pages.
European Search Report issued in related application EP 18199436.9 Jan. 29, 2019, 12 pages.

* cited by examiner

TRANSPORTER HAVING PARALLEL AND HEIGHT-ADJUSTABLE TRANSPORTING DEVICES

CROSS-REFERENCE TO RELATED APPLICATIONS

This application is the U.S. national phase of the International Patent Application No. PCT/EP2016/059790 filed May 2, 2016, which claims the priority benefit of German Application No. 10 2015 005 617.4 filed April 30, 2015, the contents of all being incorporated herein by reference.

BACKGROUND

The present application relates to an apparatus and a method for transporting standing objects such as containers, bottles, multipacks and packaged items on a transporting apparatus which comprises at least one first and one second transporting device arranged in parallel to each other, wherein the height of at least one of the transporting devices is adjustable.

Transporting apparatuses which consist of several lanes arranged in parallel are used, for example, to bring together a parallel stream of standing containers, such as for example bottles. Such an apparatus is known from DE-A1-43 32 341. The bottles are first conveyed forwards on several tracks at a first transporting speed. Via a curved rail, the bottles are then shifted onto conveyor belts running in parallel. These conveyor belts running in parallel are operated at a higher speed, with the result that the slower multi-track bottle stream is formed into a faster single-track bottle stream. The drive shafts of the conveyor belts arranged in parallel are usually connected to each other via gears, with the result that the speeds of the parallel conveyor belts always have a predefined ratio to each other.

In addition, it is known from DE-A1-198 16 960 to equip link chain conveyors with brake elements that can be raised and lowered in order to selectively stop objects to be conveyed. The brake elements are preferably arranged in parallel to the transporting direction and can be raised via a suitable hydraulic or pneumatic system in parallel to the transporting direction and above the latter. The length of the brake elements substantially corresponds to the length of individual objects. Individual objects can therefore be raised off the transporting surface of the conveyor with the brake elements, with the result that it is no longer transported further by the continuing conveyor.

From DE-A1-43 30 235 a transporting apparatus is known in which, on both sides of a continuous transporter, lifting units are provided, with which brake bars which are aligned in the longitudinal direction of the conveyor lane can be raised above the bearing plane of the conveyor lane. The bars form a slanting plane, by which the transported packaged items can be raised off the conveyor lane. Again, the length of the bars substantially corresponds to the length of individual objects. Several lifting units can be arranged one behind the other in order to make it possible to stop several packaged goods without dynamic pressure.

In order to close up gaps between transported objects, so-called catch-up sections are used in conventional transporting devices. The catch-up sections are conveyor belts arranged in parallel to the transporting direction and running at a higher speed. The objects are shifted onto these parallel catch-up sections as required. At the end of the catch-up section, the objects are then pushed back onto the original transporting device again. Because of the parallel arrangement, such catch-up sections require more space. The sideways shifting additionally represents a potential danger point as it can easily result in the transported objects tipping over.

SUMMARY

The object of the present invention is to increase the versatility of transporting apparatuses, in particular to provide the possibility of being able to control the speed of individual objects in a targeted manner and thus of being able to better monitor and control the flow of containers.

This object is achieved in the apparatus of the type named at the beginning by the features according to claim 1. The apparatus comprises at least one first and one second transporting device, which are arranged in parallel to each other and are each operated at a defined conveying speed. The first and the at least one second transporting device form a substantially closed transporting surface and have the same conveying direction. The conveying speeds of these at least two transporting devices are preferably different from each other and, still more preferably, can be set independently of each other.

In addition, at least one lifting device is provided, with which the position of the transporting planes of the transporting devices relative to each other is adjustable, with the result that at least a portion of a transporting surface of the at least one transporting device can be raised or lowered above or below a transporting surface of the other transporting device.

Objects within the meaning of the present invention can be containers such as glass bottles, plastic bottles, containers, cans, multipacks or other packaged items.

The term transporting devices, as used herein, comprises any type of transporters typically used in the transport of the above-specified objects. Bottles or cans are preferably transported on endless link chain conveyors or conveyor belts, which are motor-driven via deflection rollers and can be designed both rectilinear and curved. However, the present invention is not limited to the use in link chain conveyors or conveyor belts.

The expression "closed transporting surface", as used herein, is intended to mean that between the transporting surfaces of the individual transporting devices there are no larger gaps which can result in the transported objects falling over. During the transport of the above-defined objects, transporters with such "closed transporting surfaces" are usually always used in order to make it possible to transfer objects from one transporting device to a neighbouring transporting device.

Conventionally used link chains are pulled over slide surfaces of the frame structure. In order to minimize the friction losses that form, special lubricants are used depending on the application. However, the use of lubricants represents an increase in the amount of maintenance required. According to one aspect of the present invention, the individual links of the link chains used can have rollers, on which the link chains can roll over lanes in the frame structure of the transporting apparatus. In order to prevent the link chains from slipping sideways, partition walls are preferably provided between the lanes. The links of the link chain can additionally have lateral rollers, with which they can roll against the lateral partition walls. Through the use of rollers, the friction losses of transporting devices can be additionally reduced.

The transporting apparatus can in principle consist of any desired number of transporting devices arranged in parallel.

The transporting devices preferably run in a straight line. However, it is also possible to use the present invention in transporting devices running in a curve.

In principle, all transporting devices can be provided with lifting devices for adjusting the vertical position of the transporting surface. The transporting apparatus, on the other hand, preferably consists of height-adjustable and non-height-adjustable transporting devices arranged in alternation. The fixed or non-height-adjustable transporting devices preferably define a first transporting plane, on which the objects are conveyed, in normal operation, at a predetermined and optionally settable conveying speed. The conveying speed of the fixed transporting devices can be identical for all of the fixed transporting devices. Alternatively, the fixed transporting devices can each be operated at an individually settable speed.

The same also applies to the speeds of the height-adjustable transporting devices. These can also be operated either at individually settable speeds or at, in each case, identical speeds. The choice of the respective conveying speed of the individual transporting devices always depends on the transport task.

In the case of circulating transporting devices, such as conveyor belts or link chain conveyors, the individual conveyor belts can be equipped with conventional drive devices, such as servo motors or other electric motors. The transporting devices can additionally be coupled together, with the result that one motor drives several transporting devices at the same time. In order to actuate the conveyor belts individually, each belt must be provided with its own drive. Electric hub motors can particularly advantageously be used in this connection. Such motors can be integrated into the deflection rollers of the individual conveyor belts and therefore do not require additional space. In particular in the case of transporting devices with a number of circulating conveyor belts arranged in parallel, the necessary drive power is distributed onto a number of the hub motors, with the result that the power requirements for each individual one of the hub motors are lower. Hub motors which are operated at a voltage of less than 50 V, e.g. 48 V, are therefore sufficient to provide the required drive power. Such hub motors then additionally have the advantage that, because of these low voltages, the operational safety for the operator is increased. Due to bottles rupturing, leakages of liquids, which also always represent a safety risk for the maintenance staff when high-voltage motors are used, often occur in transporting apparatuses.

The at least one lifting device can have any desired control elements or control members known to a person skilled in the art, via which the height of the transporting devices can be controlled. Mechanical, electromotive, magnetic, pneumatic or hydraulic control elements can preferably be used here. A lifting device can have any desired number of control elements, which can be arranged distributed over the length of the transporting device. The control elements are preferably individually actuatable, with the result that the height of the transporting device is alterable in portions. An angle in the transporting direction between the transporting surfaces of the first and of the second transporting device is further preferably settable at least in portions.

The lifting devices can act directly on the transporting devices or be connected to a frame or base frame, on which the transporting devices lie. In particular in the case of conventional endless link chains or conveyor belts which run over deflection rollers attached on the front side and which are pulled over the entire transporting section over a frame structure, the lifting devices can advantageously be used to adjust the vertical position of the frame structure. In order that the objects do not tip over during the transition between transporting devices arranged at different heights, the transition must be substantially step-free. Such a step-free transition can be achieved by individually adjustable control elements.

In a further embodiment, the at least one lifting device can be an additional element which has at least two portions of different thicknesses. In this embodiment, the height-adjustable transporting device is preferably a circulating conveyor belt or a link chain conveyor. The additional element is arranged between the substructure of the transporting apparatus and the upper run of the conveyor belt, with the result that the upper run is guided over the additional belt. If the thinner portion of the additional element is arranged under the conveyor belt, the transporting surface of the height-adjustable conveyor belt is located in a lower position in which it does not engage with the transported objects. If, on the other hand, the additional element is positioned such that the portion with the larger thickness is arranged directly underneath the conveyor belt, the conveyor belt is raised by this portion above the transporting plane of the fixedly arranged transporting devices and engages with the objects.

In an advantageous embodiment, the additional element is an endless belt which is guided on the front side over deflection rollers and which has a tongue, which represents an area of increased thickness. In the area of the upper run, thus in the area of the transporting surface of the height-adjustable conveyor belt, the additional circulating belt runs in direct contact with the upper run of the height-adjustable conveyor belt. The deflection rollers are provided with an actuator, via which the additional endless belt can be positioned. In order to raise the height-adjustable conveyor belt, the additional endless belt is positioned such that the thicker area of the tongue is located underneath the upper run and the latter is therefore guided over the tongue. In this area, the height-adjustable conveyor belt is pressed upwards by the tongue, with the result that the transporting surface of the upper run is raised above the transporting plane of the fixed transporting devices. The length of the raised area can be adjusted by rotation of the additional endless belt. This embodiment in particular offers the advantage that it can be implemented relatively simply in terms of construction and, because of the robust mechanical elements, is relatively low-maintenance. The tongue can moreover be very precisely positioned, with the result that the transition area, thus the area in which the transporting planes of the transporting devices intersect, can be defined directly and thus very exactly.

Depending on whether the endless belt with a tongue is provided underneath the more quickly running transporting devices or underneath the more slowly running transporting devices, this embodiment can be used for simple catch-up sections or to produce accumulation sections. It is also possible for each transporting device to be equipped with an endless belt with a tongue, with the result that, depending on the transport task, one and the same apparatus can be used as the catch-up section or as the accumulation section. A further possibility for a lifting device is, for example, a screw with a control element arranged under a transporting device. By rotation of the screw, the control element is moved in terms of height corresponding to the incline and the diameter of the screw.

The lifting devices comprise for example eccentric rods which can be arranged, for example, underneath the transporting devices. By rotation of the eccentric rods, the height of the transporting devices can then be varied. With the alteration in the height, the position of the transition area, thus the area in which the transporting planes of the transporting devices intersect, can then also be adjusted again here.

There is also the possibility of combining different elements of the individual embodiments with each other. For example, in an embodiment of the invention in which the at least one height-adjustable conveyor belt has an additional endless belt with a tongue, a device can also additionally be provided with which the entire height-adjustable transporting device can be moved vertically relative to the non-height-adjustable transporting device. In a manner of speaking the base line of the height-adjustable and of the non-height-adjustable transporting devices can thereby then be shifted relative to each other, and thus the transporting apparatus can be optimally adapted to the respective transport requirements.

The present invention can particularly advantageously be used in the operation of wide conveyor sections on which the objects are transported in multiple rows. The width of the individual transporting devices is advantageously approximately the same size in each case. However, transporting devices with different widths can also be combined with each other. Transporting apparatuses according to the invention will usually have height-adjustable and non-height-adjustable transporting devices in alternating sequence, wherein the objects in each case stand only on those transporting devices which are currently arranged precisely at the top. The objects therefore usually stand only on every second transporting device. In order that the objects nevertheless stand securely on the transporting apparatus at all times, the width of the transporting devices should be at most 50% of the width or of the cross section of the base of the objects to be transported. The smaller the width of the transporting devices relative to the objects to be transported, the greater the stability of the objects.

The width of the transporting devices should therefore further preferably be less than 30%, and still more preferably less than 20% of the width of the base of the objects to be transported. Typical drinks bottles used today have a substantially cylindrical shape and a base diameter of from approximately 5 cm to 12 cm. The width of the conveyor belts should therefore be less than 6 cm, preferably less than 5 cm and further preferably less than 3.5 cm and particularly preferably approximately 1.5 cm to 2 cm. In principle, it is true that the objects stand better and more stably if the conveyor belts are narrower, as then the objects always stand on and are transported by several conveyor belts at the same time.

In a further embodiment, the transporting apparatus according to the invention can also be provided with height-adjustable webs or bars running in the transporting direction. These webs are preferably actuatable via their own control elements. The control elements can be chosen as desired, wherein mechanical, magnetic, pneumatic or hydraulic control elements are likewise preferred again.

The number of webs used can in principle be chosen freely and depends on the dimensions of the transporting device and the objects to be transported. One web is preferably provided between each transporting device. The webs can be actuated together, in groups or individually.

The webs can be actuated together, in groups or individually. The webs can in principle have any desired length, as long as this is at least twice the largest diameter of the base of the objects. The webs can, for example, have a length of between 0.3 m and 5 m, preferably of between 0.5 m and 2 m. In order that there are no steps during the transition from the transporting devices to the webs, the webs preferably form a slanting plane, onto which the objects are slid. Alternatively or additionally, the webs can also be provided with downwardly inclined guide plates on the front sides, with the result that a step-free sliding of the objects is also made possible when the webs are movable in parallel to the transporting plane.

The webs are preferably vertically movable in a step-free manner, with the result that not only can the two extreme points of the web control, thus "webs fully extended" and "webs fully lowered", be set, but any desired intermediate settings are also possible. The webs can, for example, raise the objects so slightly above the transporting plane that the strength of the friction between the objects and the conveyor belts, and the corresponding drive force acting on the objects can be altered continuously. The objects can thus be decelerated and accelerated in a targeted manner, wherein the danger of the containers tipping over is largely reduced. The webs can preferably be provided with special coatings, with the result that the friction coefficient of the webs can be defined and adapted to the respective transport requirements.

Advantageous lifting devices comprise, for example, eccentric rods which can be arranged, for example, underneath the webs or transporting devices. By rotation of the eccentric rods, the height of the webs or transporting devices can then be varied.

A further possibility for a lifting device is, for example, a screw with a control element arranged under the web or the transporting device. By rotation of the screw, the control element is moved in terms of height corresponding to the incline and the diameter of the screw.

The surface of the upper side of the webs can also have a profiling, with the result that a friction force directed laterally corresponding to the profile can be exerted on the objects to be transported. The profiling preferably consists of diagonal strips of a coating with increased friction, wherein the strips are arranged at an angle diagonal to the transporting direction. Instead of strips, the webs can also have diagonal slots in the surface. The direction of the profiling then indicates in which direction the objects are deflected. The profile can also change along the webs, with the result that differing deflection behaviour is achieved over the length of the webs. It is also possible to arrange two height-adjustable webs with different profiles next to each other. Depending on the respectively required deflection, a decision can then be made as to whether only one or both webs are to be extended.

The transporting apparatus can also have horizontally movable control elements, with which the webs and/or transporting devices can be moved transverse to the conveying direction. The transporting apparatus, in particular the distance between the individual webs and/or transporting devices, can thereby be adapted variably to the size of the objects to be transported.

The webs can serve to raise the containers to be transported completely off the transporting apparatus. Such webs can be advantageously used, in particular, in multi-lane accumulation sections. During the accumulation of the objects, namely substantial pressures and, due to the friction of the conveyor belts running under the backed-up objects, high tensile loads, which act both on the belt and on the drive device, result at the output of the accumulation sections. In addition, a considerable energy saving can be achieved due to the prevention of these friction losses.

The present invention also relates to a method for transporting objects and for controlling the flow of containers.

The method comprises providing a first transporting device which has a first conveying speed, and providing at least one second transporting device which is arranged in parallel to the first transporting device and has a second conveying speed. The method furthermore comprises the step of adjusting the height of at least one of the transporting devices, with the result that at least a portion of a transporting surface of the at least one transporting device can be raised or lowered above or below a transporting surface of the other transporting device. The objects are in each case transported only on the transporting device that is arranged higher, with the result that the effective transporting speed is defined by variation of the height of the transporting devices.

The present invention can advantageously be used in various fields of container-flow control. For example, in conveyor systems, accumulation sections are often required, on which objects to be transported can accumulate in several parallel lanes. Between the conveyor belts and the objects backed up thereon, high friction losses occur which lead to increased tensile loads of the conveyor belts and drive motors. With the transporting apparatus according to the invention, the backed-up objects can be raised off the continuously moving first conveyor device and be further conveyed, instead, on the second transporting device at a reduced speed.

In addition, with the present invention, variable acceleration sections can also be implemented which can be used as required and can be actuated according to the actual transport need. In a simple embodiment, the objects can here be driven forwards by the first transporting device and then transferred to the more quickly running second transporting device. The transporting plane of the second transporting device is expediently slightly inclined relative to the transporting plane of the first transporting device, with the result that the objects can be conveyed step-free from one transporting device to the other transporting device. At the end of the acceleration section, the objects are deposited on the first transporting device again. As it is also not necessary for the objects to shift across here, the danger of the objects tipping over is reduced.

A further field of use of the present invention is the separating, free of dynamic pressure, of objects transported in groups. To date, for this, a multi-track container stream is guided onto an acceleration area on which in each case the front-most row of containers is released offset in time. The row of containers is then guided along a long rail, against which the containers ideally arrange themselves one behind the other and form a single-track container stream. The containers here are not guided, and again and again it happens that two containers run next to each other onto the rail and cannot arrange themselves one behind the other without help. With the present invention, this method can be better monitored by controlling individual containers by targeted lowering of the transporting devices and releasing them one after the other onto the discharging transporting device. With the control, it can be ensured that the objects are in each case released individually, and that a simultaneous release of two containers is prevented. The containers can therefore be formed into a single-track stream against a comparatively short rail.

A further field of use is the control of the flow of containers in a single-track container stream. By selective acceleration or deceleration of individual objects, the distance between the individual objects can be adjusted in a targeted manner. It is thereby possible to form groups of objects or else also to adjust the distance between individual objects in a targeted manner. In particular the latter can be used very advantageously in combination with inspection, labelling or filling devices typically used in filling systems. For this, the containers are usually put at a predefined spacing during the transfer into such devices via infeed worms. However, neither can such passive infeed apparatuses react to disruptions in the flow of containers nor are they flexibly usable for various systems. Through the present invention, on the other hand, objects can be put at the respectively required spacing in a targeted manner or adapted to new transport tasks.

With the present invention, it is not only possible to convey the individual objects at the transporting speed of the transporting devices arranged in parallel. If the different transporting devices are located almost at the same height, all of the transporting devices contribute to the transport of the objects. The objects engage with the different transporting devices in alternation. The conveying speed that actually results then not only depends on the absolute speeds of the individual transporting devices, but also depends on how strongly the objects engage with the different transporting devices. Through exact adjustment of the height of the different transporting devices, any desired effective intermediate speeds can thus also be set. Setting a very slow transition makes it possible to slowly increase the resulting intermediate speed, with the result that abrupt accelerations during the transition of the objects from one transporting apparatus to the other can be prevented.

The exact setting of intermediate speeds can also be utilized advantageously during the separating of a multi-track container stream. The bottle throughput at the output of a separating area is determined using the speed of the discharging transporting device alone. If the multi-track feeding area is equipped with the transporting apparatus according to the invention, the effective conveying speed can be set by a variation in the height difference of the parallel transporting devices such that the fed-in quantity of bottles corresponds precisely to the bottle throughput at the output of the separating area. To regulate the intermediate speed, the actual conveying speed of individual bottles or also the resulting group speed of bottle groups can be determined, for example, with the aid of cameras. Depending on the measurement data, the vertical position of the transporting devices can then be adjusted.

Various of the above-described embodiments and control methods can also be combined within a transporting apparatus. The transporting apparatus according to the invention can thereby be used in an even more versatile manner. For example, through a combination of different lifting devices on one and the same transporting apparatus, a normal conveyor section, a catch-up section and an accumulation section can be realized. Depending on the current conveying task, the conveying characteristics of the transporting apparatus can then be adjusted. It is then even possible to implement, in portions on one transporting apparatus, a catch-up section and, at the same time, in another portion of the transporting apparatus, an accumulation section.

BRIEF DESCRIPTION OF THE DRAWINGS

Embodiment examples of the invention are explained below with reference to the drawings. There are shown in.

DETAILED DESCRIPTION

Figure 1:
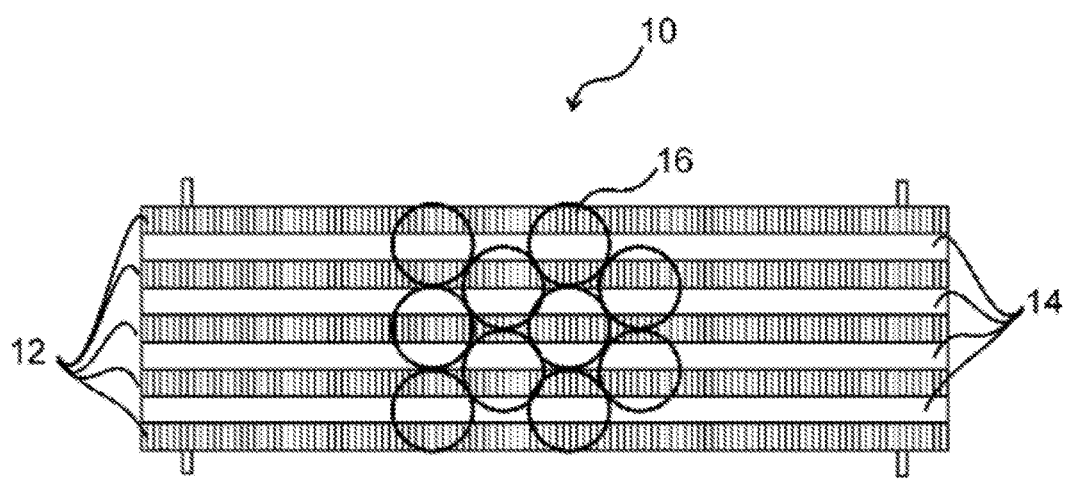
FIG. 1 a top view of a transporting apparatus with fixed and height-adjustable transporting devices arranged in alternation.

FIG. 1 shows a transporting apparatus 10 with several transporting devices 12, 14 arranged in parallel, on which a plurality of objects 16 are transported. In this example, the transporting devices 12, 14 are circulating conveyor belts, and the objects 16 are drinks bottles. The conveyor belts 12, 14 are designed as fixedly arranged conveyor belts 12 and as height-adjustable conveyor belts 14 in alternation. Instead of conveyor belts, however, link chain conveyors or other suitable transporting devices can be used just as well.

Figure 2:
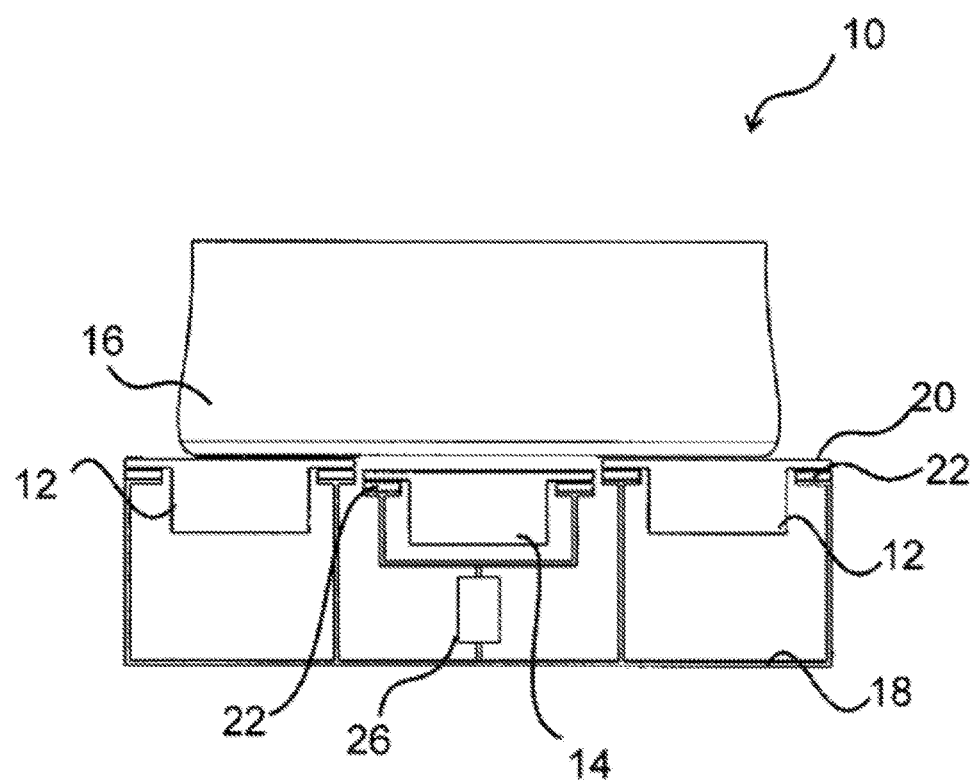
FIG. 2 a cross-sectional view of the transporting apparatus from FIG. 1 with lowered transporting device.
Figure 3:
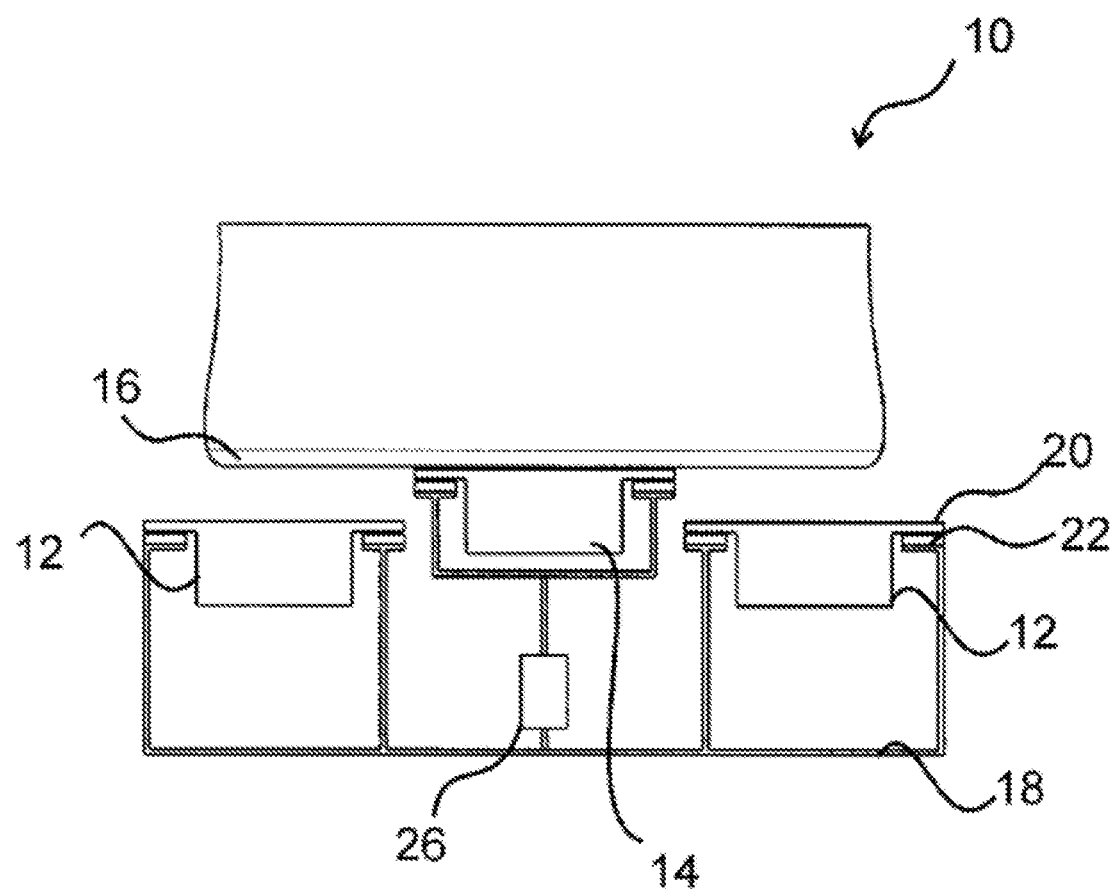
FIG. 3 a cross-sectional view of the transporting apparatus from FIG. 1 with raised transporting device.

The transporting apparatus 10 is shown in a cross-sectional view orthogonally to the conveying direction in FIGS. 2 and 3. FIG. 2 shows a section of the transporting apparatus 10 with two fixedly arranged transporting devices 12 and a height-adjustable transporting device 14, which are arranged in a frame structure 18. Each conveyor belt 12, 14 has lateral shoulders 20, with which the conveyor belts 12, 14 lie on bearing surfaces 22 of the frame structure 18.

The middle conveyor belt 14 in FIGS. 2 and 3 is designed height-adjustable. For this, the frame structure 18 has a control member 26, with which the bearing surfaces 22 on which the height-adjustable conveyor belt 14 lies can be moved in terms of height. In the configuration shown in FIG. 2, the control member 26 is retracted, with the result that the transporting surface of the conveyor belt 14 is lowered below the transporting plane, which is defined by the non-height-adjustable conveyor belts 12. The bottle base of the bottle 16 to be transported therefore stands exclusively on the two fixedly arranged conveyor belts 12 and is therefore moved at the transporting speed of these conveyor belts.

In order that the bottle stands securely on the conveyor belts 12, 14, the width of the conveyor belts 12, 14 is approximately 40% of the diameter of the bottle 16 to be transported.

In FIG. 3, on the other hand, the control member 26 is extended, with the result that the height-adjustable conveyor belt 14 is raised above the transporting plane predefined by the fixedly arranged conveyor belts 12. In this configuration, the bottle 16 stands only on the height-adjustable conveyor belt 14 and is therefore moved at the transporting speed of this conveyor belt.

The transporting apparatus 10 preferably comprises several control members 26, with the result that the height of the conveyor belts 14 can be varied over the length of the transporting apparatus 10 and the bottles 16 to be transported are moved in portions on the fixed or on the height-adjustable conveyor belts 12, 14.

Figure 4:
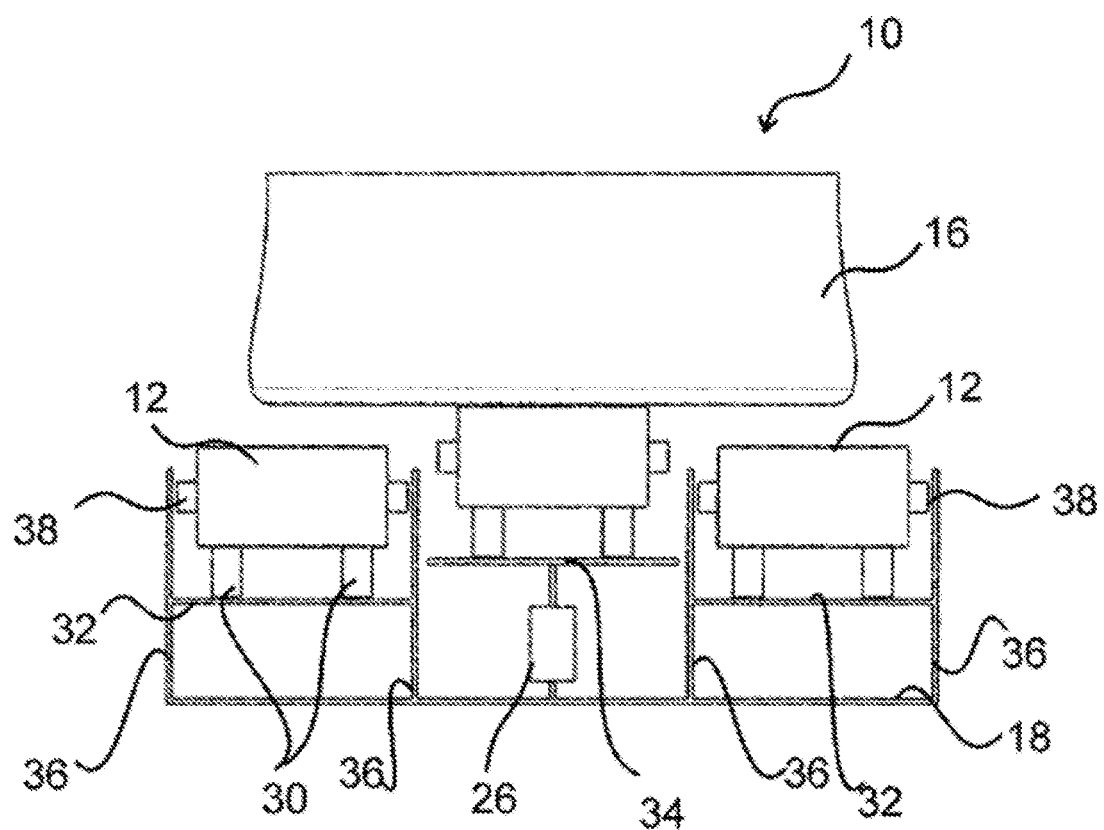
FIG. 4 a cross-sectional view of the transporting apparatus from FIG. 1, wherein the transporting devices are provided with rollers.

In the embodiments shown in FIGS. 2 and 3, the conveyor belts 12, 14 are pulled with their shoulders 20 over the continuous bearing surfaces 22 of the frame structure 18. This technique is currently used in most transporting apparatuses, although here a high material load results for the conveyor belts 12, 14 and the drive units and although substantial energy losses also occur thereby. In FIG. 4 therefore a further embodiment of the present invention is represented in which the individual conveyor belts 12, 14 arranged in parallel are each provided with rollers 30, via which the conveyor belts 12, 14 roll on lanes 32, 34 in the frame structure 18 of the transporting device 10. The lanes 32, 34, on which the conveyor belts 12, 14 roll, are again designed height-adjustable and fixed in alternation. The height-adjustable lane 34 shown in FIG. 4 is moved vertically via the control member 26.

Figure 5:
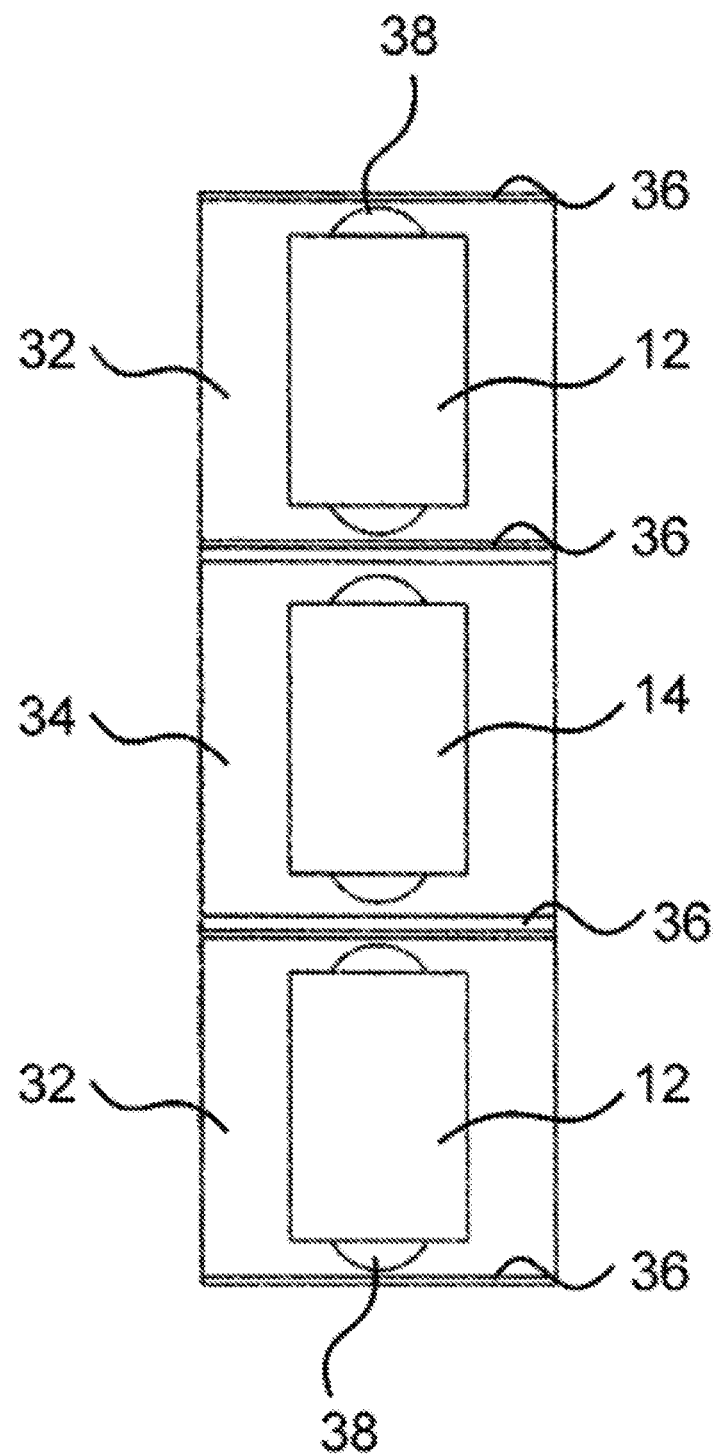
FIG. 5 a top view of the transporting apparatus from FIG. 4.

In order to prevent the individual conveyor belts 12, 14 from slipping sideways, partition walls 36 are provided between the lanes 32, 34. As the partition walls 36 for their part represent a source of additional friction losses, the conveyor belts 12, 14 are also provided with rollers 38 on the side, with which the conveyor belts 12, 14 can roll against the partition walls 36. These rollers 38 provided on the side can be seen particularly well in FIG. 5, which represents a top view of the transporting apparatus 10 from FIG. 4. Here, in each case, only one element or a short portion of each conveyor belt 12, 14 is depicted.

Figure 6:
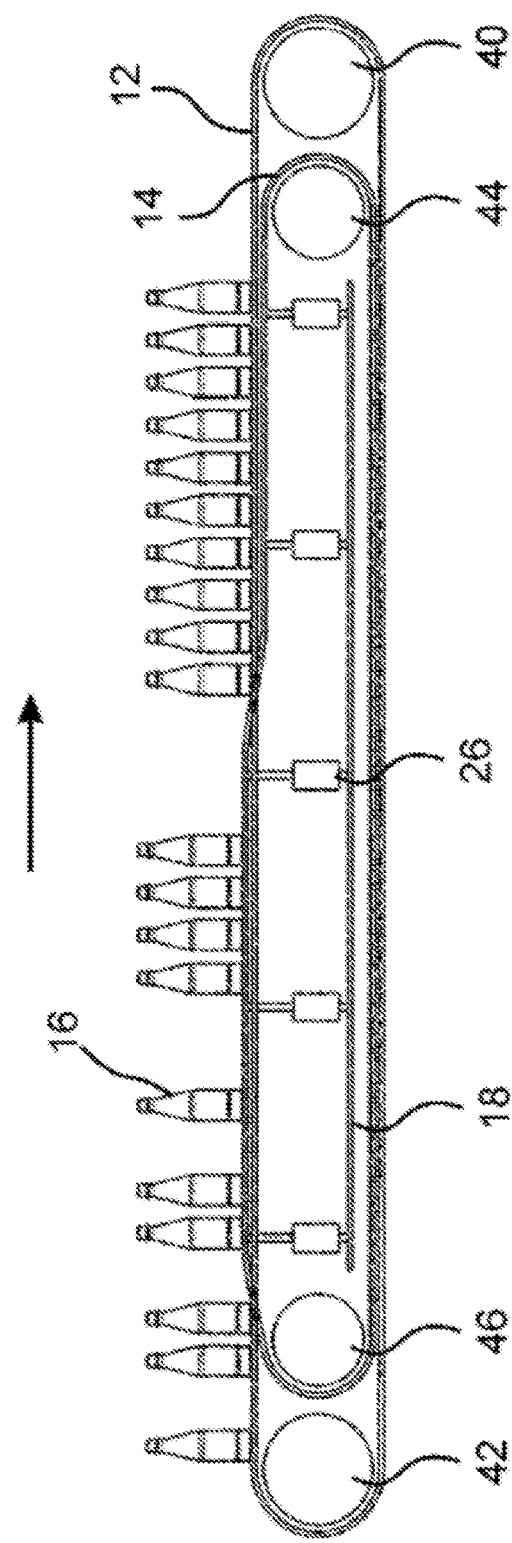
FIG. 6 a side view of a transporting apparatus with control members distributed over its length.

A side view of a transporter with non-height-adjustable and height-adjustable parallel transporting lanes 12, 14 in alternating sequence is shown in FIG. 6. In the side view, in each case, only one height-adjustable conveyor belt 14 and one non-height-adjustable conveyor belt 12 are represented. Of course, however, any desired number of conveyor belts 12, 14 can be arranged in any desired, preferably alternating sequence. The actual arrangement and number of conveyor belts 12, 14 used depends on the respective intended use. For the sake of clarity, the frame structure over which the conveyor belts 12, 14 run and on which the control members 26 engage is only indicated in FIG. 6. The frame structure 18 can, however, be one of the frame structures from FIG. 2, 3 or 4.

The non-height-adjustable conveyor belt 12 substantially corresponds to a conventional circulating conveyor belt which is stretched over two deflection rollers 40, 42. The front deflection roller 40 in the transporting direction (indicated by the arrow in FIG. 6) is the drive roller, via which a motor drives the conveyor belt 12. The non-height-adjustable conveyor belts 12 define a first transporting plane, on which the bottles 16 are moved at the circulating speed of these conveyor belts.

Between the deflection rollers 40, 42 of the non-height-adjustable conveyor belts 12 there are two further deflection rollers 44, 46 with a smaller diameter, via which the height-adjustable conveyor belts 14 are guided. The height-adjustable conveyor belts 14 have, at regular intervals, extendible control elements 26, with which the corresponding conveyor belts 14 can be raised above the transporting plane of the non-height-adjustable conveyor belts 12.

The apparatus represented in FIG. 6 can be used particularly advantageously as a catch-up section. Catch-up sections serve to close up gaps during the transport of containers. For this, to date, containers are usually pushed onto faster transporters running in parallel for a short time. Due to the increased transporting speed, gaps to a bottle stream that is getting ahead can be closed up. The shifting across and subsequent acceleration of the containers is relatively prone to disruption and space-intensive, however.

The present invention, on the other hand, offers a new method for implementing catch-up sections which do not require additional space, which are flexibly usable and in which the risk of the containers tipping over is reduced compared with conventional catch-up sections. If it is necessary to convey containers at increased speed for a short time, in order to close up any gaps that have formed to containers that are getting ahead, for this, in the apparatus shown in FIG. 6 the control elements 26 can be extended in portions in order to raise the transporting surfaces of the height-adjustable conveyor belts 14 in the relevant portions above the transporting plane of the non-height-adjustable transporting lanes 12. Due to the raising, these conveyor belts then engage with the bottles and transport them at a higher speed in the respective portion.

The raising is preferably effected such that, at least in portions, an acute angle is set between the height-adjustable conveyor belts 14 and the non-height-adjustable conveyor belts 12, with the result that the bottles 16 are pushed onto the height-adjustable conveyor belts 14, substantially like in the case of a slanting plane. A transition area results in which the bottles 16 are gradually raised off the transporting plane of the non-height-adjustable conveyor belts 12 and slowly engage with the height-adjustable conveyor belts 14.

The length of the catch-up section can be adapted to the respective operating state in the embodiment represented in FIG. 6. For this, the control members 26 can be actuated individually. For example, only the first three control members 26 are extended in FIG. 6. The bottles 16 which are located in this area stand on the transporting surface of the more quickly moving height-adjustable conveyor belts 14 and are therefore transported at a higher speed in this area. In the second portion of the transporting apparatus, thus in the area of the not extended control members 26, on the other hand, these bottles 16 are again deposited on the transporting planes of the non-height-adjustable conveyor belts 12 and are there conveyed further at their slower transporting speed. The catch-up section can be switched on as required in the embodiment in FIG. 6. If, on the other hand, no transporting gaps occur, a constant transporting speed over the entire conveyor path can be used by lowering all of the control members 26.

In the embodiment in FIG. 6, the height-adjustable conveyor belts 14 have a shorter transport path than the non-height-adjustable conveyor belts 12. However, it is also possible for all of the conveyor belts 12, 14 to be the same length and to be arranged offset relative to each other in the transporting direction. In order to provide particularly long conveyor sections, several transporting apparatuses 10 can also be arranged one behind the other. At the transitions between the individual transporting apparatuses 10, the corresponding ends of the transporting devices 12, 14 can then mesh with each other like a fan in order thus to define a continuous transporting plane.

Figure 7:
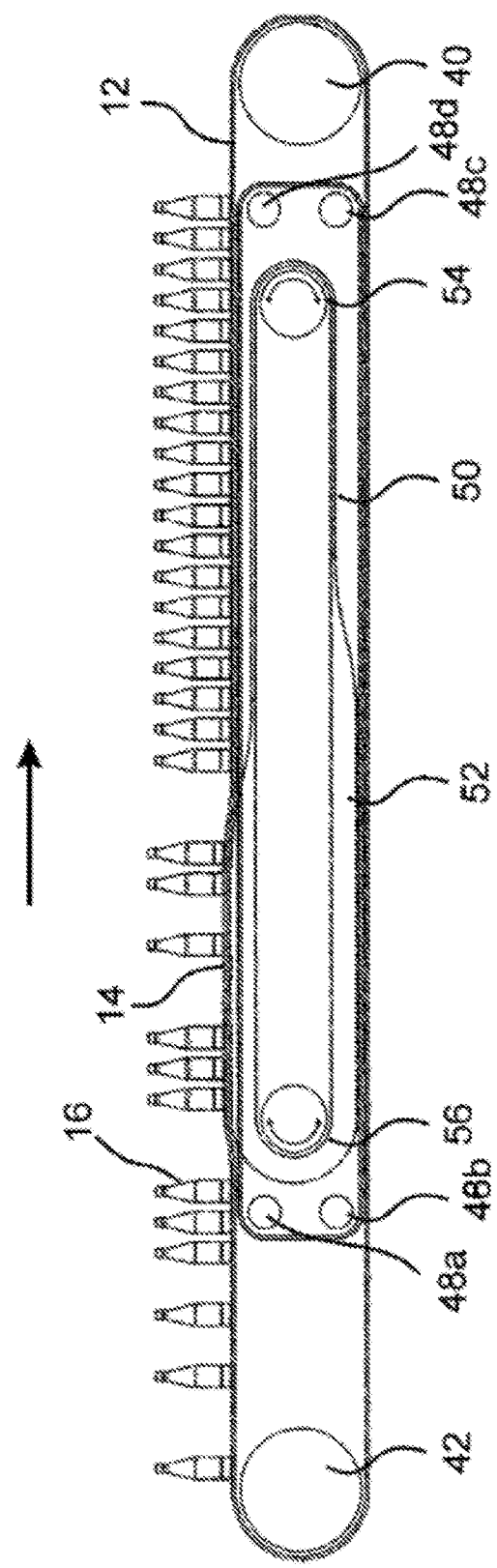
FIG. 7 a side view of a transporting apparatus with an additional belt with a tongue.

A further embodiment of the present invention is depicted in a side view in FIG. 7. For the sake of clarity, in each case, again only one conveyor belt is shown. As in FIG. 6, the non-height-adjustable conveyor belt 12 substantially corresponds to a conventional circulating conveyor belt, which is stretched over two outer deflection rollers 40, 42, wherein the non-height-adjustable conveyor belts 12 define a first transporting plane, on which the bottles 16 can be conveyed at the circulating speed of these conveyor belts 12.

The height-adjustable conveyor belts 14 in this embodiment are guided via four outer deflection rollers 48a, 48b, 48c, 48d. The crest of the upper deflection rollers 48a, 48d is located underneath the transporting plane of the non-height-adjustable conveyor belts 12, with the result that the height-adjustable conveyor belts 14 are first arranged underneath this transporting plane.

In order to raise the height-adjustable conveyor belts 14, in this embodiment not individual control members that are adjustable independently of each other are provided. Instead of this, an additional circulating belt 50 is provided which is stretched over deflection rollers 54, 56 and has a tongue 52 or an area of increased thickness. This additional belt 50, as depicted in FIG. 7, is guided directly below the height-adjustable conveyor belt 14. In order to raise the height-adjustable conveyor belt 14, the tongue 52 of the additional belt 50 is moved below the transporting surface of the upper run of the height-adjustable conveyor belt 14. The tongue 52 presses the transporting surface of the height-adjustable conveyor belt 14 upwards above the transporting plane of the non-height-adjustable conveyor belts 12. The length of the catch-up section can be adjusted in a simple manner by rotation of the additional circulating belt 50.

Figure 8:
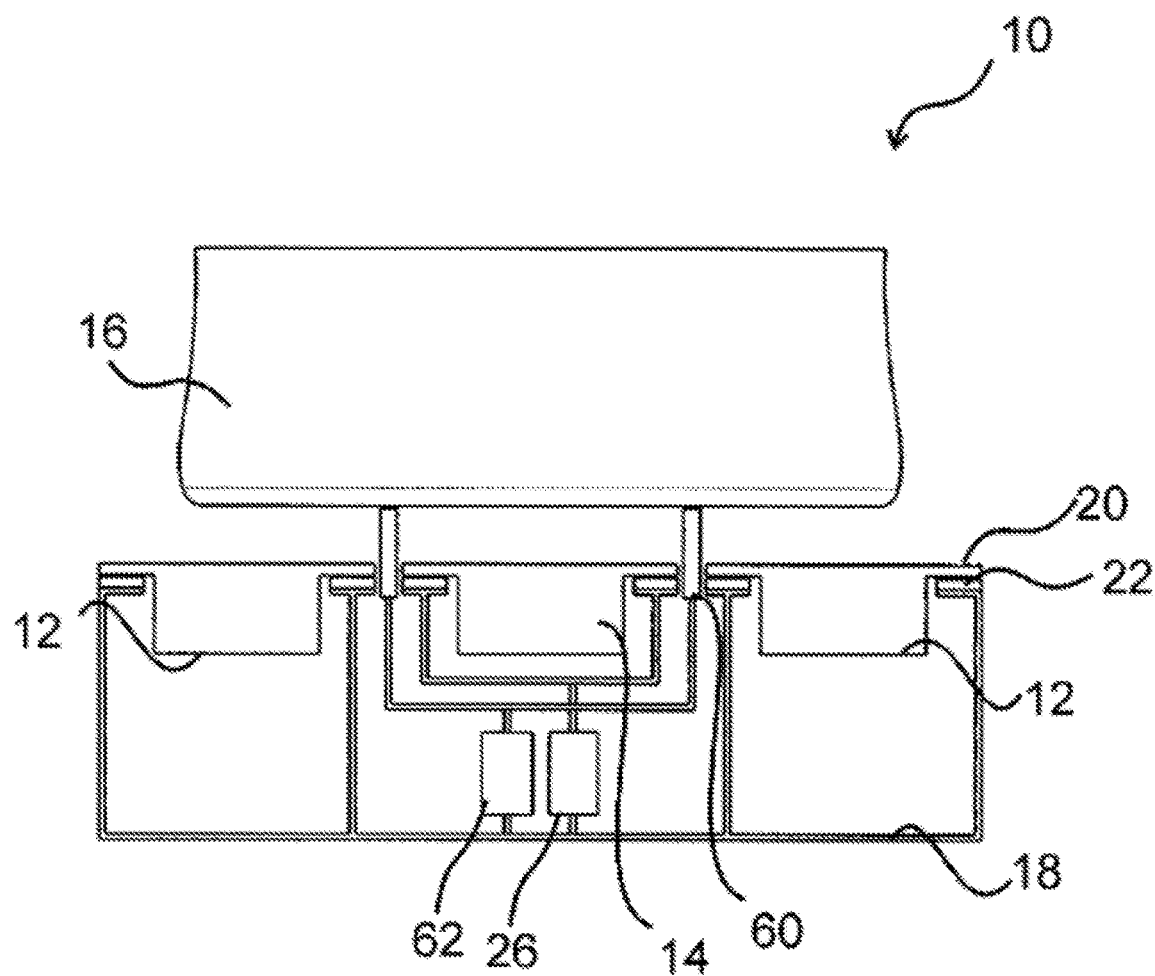
FIG. 8 a cross-sectional view of a transporting apparatus with height-adjustable transporting devices and height-adjustable webs.

The embodiment represented in FIG. 8 is a modification of or supplement to the embodiment from FIGS. 2 and 3. Here, height-adjustable webs 60 of narrow width are arranged between the conveyor belts 12, 14. The webs 60 are actuatable via their own control element 62 and serve to raise the bottles 16 to be transported completely off the transporter. The bottle 16 in FIG. 8 stands exclusively on two neighbouring webs 60 and is therefore currently not transported.

Figure 9:
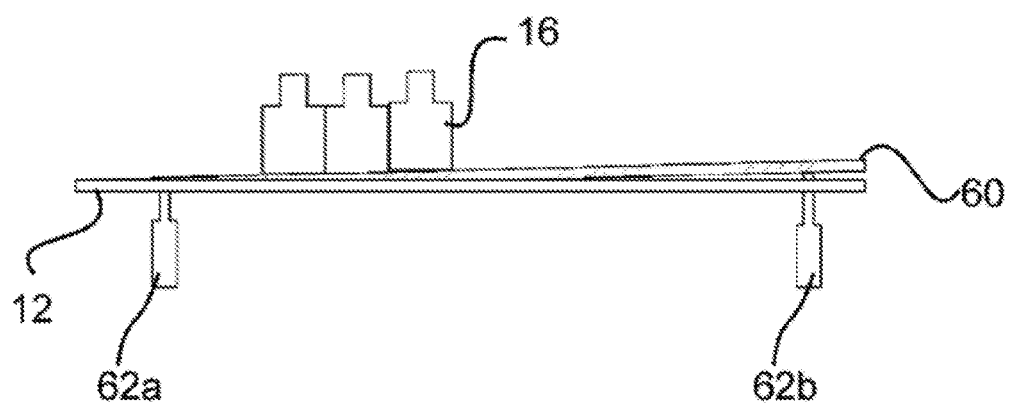
FIG. 9 a side view of the transporting apparatus from FIG. 8.

A side view of a transporting apparatus 10 with webs 60 is depicted in FIG. 9. The webs are positioned via two control elements 62a, 62b. In order to make it possible to push the bottles 16 onto the webs 60 as gently as possible, the webs 60 are positioned such that they form a slanting plane onto which the individual bottles 16 are then pushed little by little. To release the bottles 16, the webs 60 are then lowered at least at the end located downstream, with the result that the bottles 16 can then be deposited on the transporting apparatus 10 and transported further.

As the bottles 16, as long as they stand on the webs 60, are not in contact with the conveyor belts 12, 14, no friction also forms between the bottles 16 and the conveyor belts 12, 14, with the result that with this embodiment, in particular in the implementation of accumulation sections, a substantial energy saving can be achieved.

Figure 10:
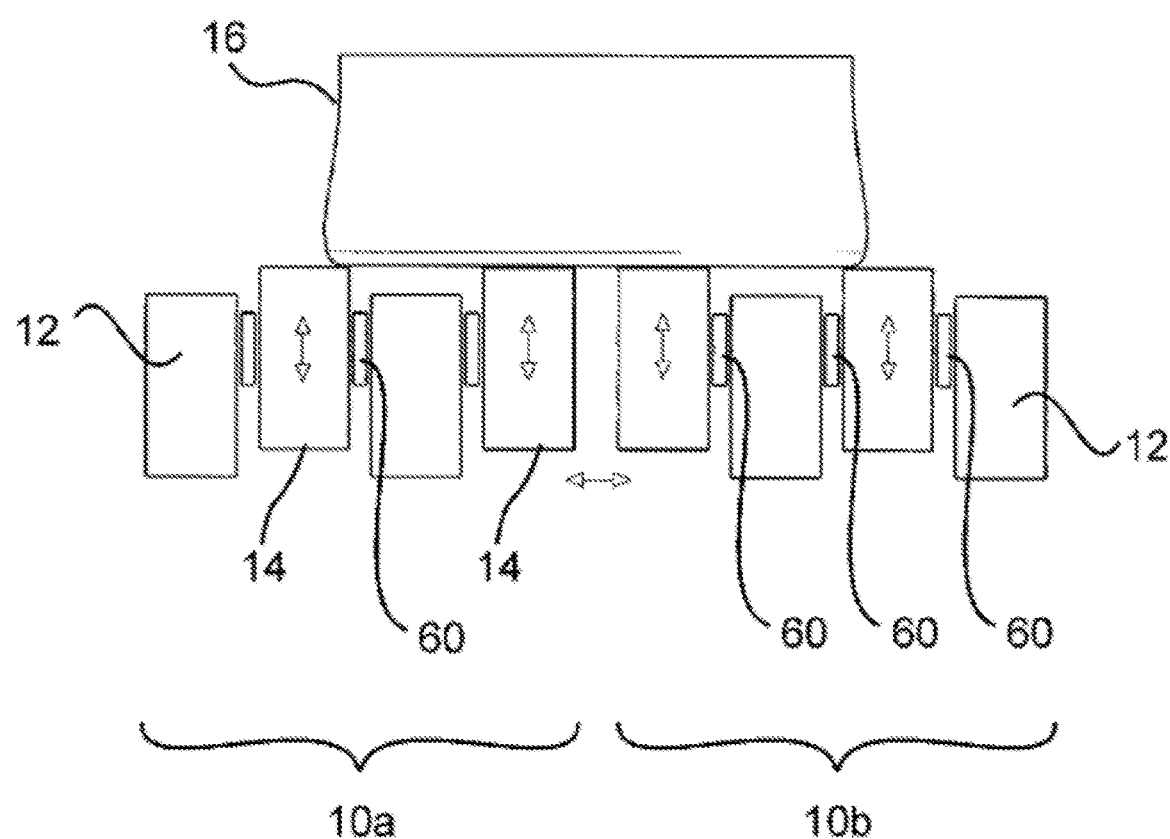
FIG. 10 a cross-sectional view of a transporting apparatus with height-adjustable transporting devices and webs and an adjustable horizontal spacing.

Finally, an embodiment is represented in FIG. 10 in which the transporting apparatus 10 comprises two blocks 10a, 10b. Each block 10a, 10b consists of two height-adjustable and two non-height-adjustable conveyor belts 12, 14, as well as of three height-adjustable webs 60. The blocks 10a, 10b are movable relative to each other in a horizontal direction transverse to the conveying direction, with the result that the distance between these blocks 10a, 10b can be adjusted. The transporting apparatus 10 can thereby be optimally adapted to the size of the containers 16 to be transported. Again, any desired control elements known to a person skilled in the art can be used for the horizontal positioning.

Figure 11:
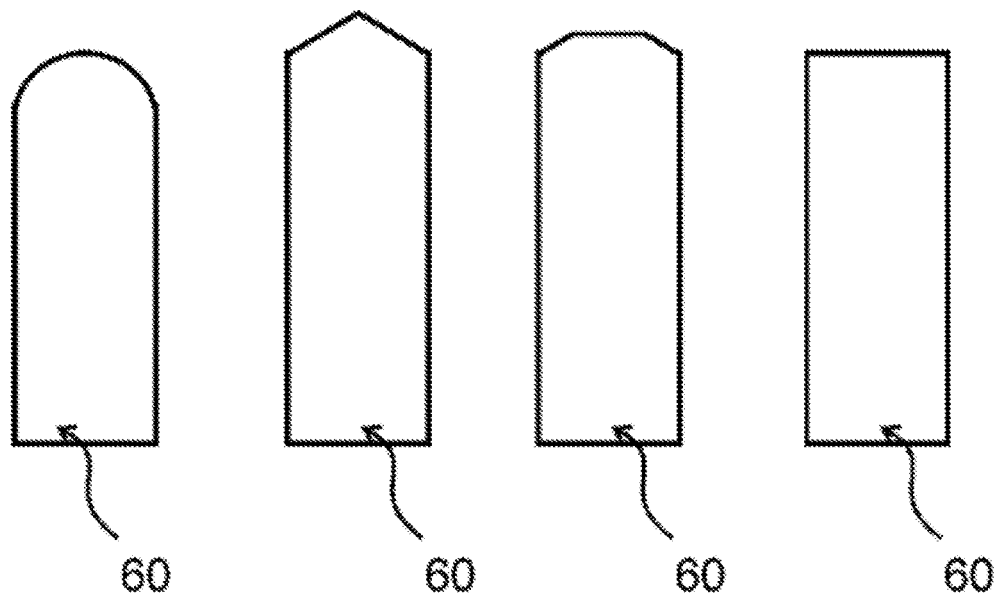
FIG. 11 various web profiles.

During the forming of container streams, the containers 16 are often also shifted with a component transverse to the transporting direction on the transporting apparatus 10. However, in an embodiment with webs this means that the containers 16 must be pushed transversely over the possibly slightly elevated webs. Webs with a rectangular profile would act as step edges, and could cause the containers 16 to tip over. In order to prevent such a tipping, the webs expediently have a rounded or faceted profile. Possible profile shapes for the upper sides of the webs are depicted in FIG. 11.

Figure 12:
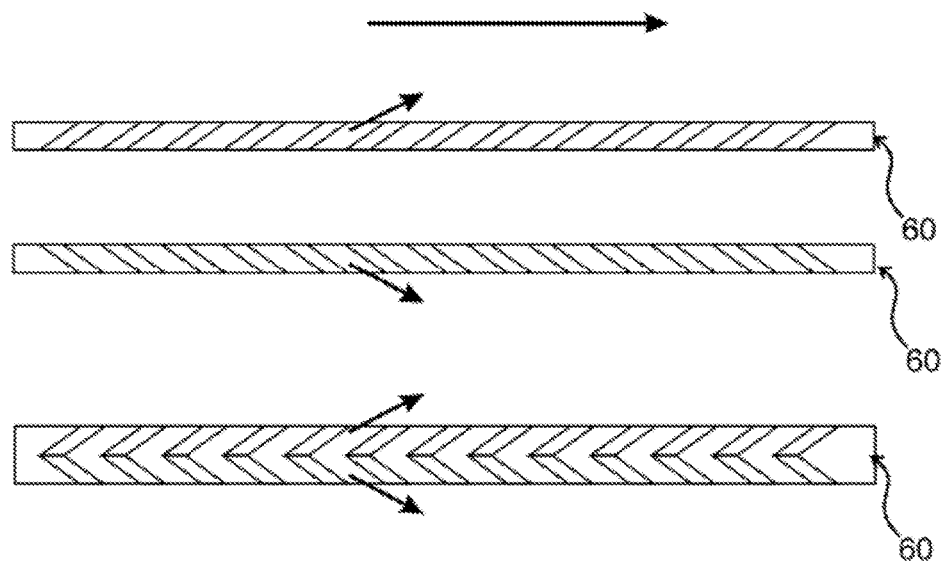
FIG. 12 various surface profiles of the webs.

In FIG. 12 upper sides of webs are depicted which each have a different friction profile. The friction profile can consist, for example, of strips of a friction coating. The profile can also be formed by slots arranged diagonally. If the webs are extended only so far that, although the objects are still conveyed, a friction is generated between the surface of the webs and the objects, then a deflection of the objects can be achieved due to the friction profile. The direction of the friction profile indicates in which direction the objects to be transported are deflected. The deflection direction is represented by the respective arrows in FIG. 12.

LIST OF REFERENCE NUMBERS 10 transporting apparatus
12 fixedly arranged transporting device
14 height-adjustable transporting device
16 object
18 frame structure
20 lateral shoulders
22 bearing surfaces
26 control elements
30 rollers
32 fixedly arranged lanes
34 height-adjustable lanes
36 partition walls
38 lateral rollers
40 front deflection roller
42 rear deflection roller
44 further deflection roller
46 further deflection roller
48 deflection rollers
50 additional circulating belt
52 tongue
54 deflection roller
56 deflection roller
60 height-adjustable web
62 control element

The invention claimed is:

1. An apparatus for transporting standing objects, such as containers, bottles, multipacks and packaged items, comprising:
   a first transporting device, which has a first conveying speed, and
   at least one second transporting device, which is arranged in parallel to the first transporting device and has a second conveying speed,
   wherein the first and the at least one second transporting device together form a substantially closed transporting surface and have the same conveying direction,
   the apparatus furthermore comprising
   at least one lifting device comprising a circulating belt with a tongue, with which at least one of the transporting devices is height-adjustable, with the result that at least a portion of a transporting surface of the at least one transporting device can be raised and/or lowered above and/or below a transporting surface of the other transporting device.

2. The apparatus according to claim 1, wherein the speed of the at least one first transporting device and the speed of the at least one second transporting device is adjustable.

3. The apparatus according to claim 1, wherein the at least one first transporting device and at least one second transporting device are tiltable relative to each other in the conveying direction at least in portions, with the result that an angle results at least in portions between the transporting surfaces of the first and of the second transporting device.

4. The apparatus according to claim 1, wherein the width of the transporting devices is in each case approximately the same size and smaller than 50%, of the width of the base of the objects to be transported.

5. The apparatus according to claim 1, wherein the transporting devices are in each case driven individually via hub motors, which are operated with a voltage of less than 50 V.

6. The apparatus according to claim 1, wherein the transporting devices are height-adjustable via lifting devices at the front and/or rear end, and wherein the lifting devices have mechanical, electromotive, pneumatic or hydraulic control elements.

7. The apparatus according to claim 1, wherein the transporting apparatus has height-adjustable webs, which can be positioned vertically via lifting devices, with the result that at least a portion of the webs can be raised and lowered above and below the transporting plane of the transporting apparatus.

8. A method for transporting objects, such as containers, multipacks and packaged items, and for separating, free of dynamic pressure, objects transported on a transporting apparatus, wherein, on an accumulation section of the transporting apparatus, a multi-row group of objects is first raised off the transporting plane of the transporting apparatus by means of height-adjustable webs, comprising:
   a first transporting device, which has a first conveying speed,
   at least one second transporting device, which is arranged in parallel to the first transporting device and has a second conveying speed,
   wherein the height of at least one transporting device is adjustable, with the result that at least a portion of a transporting surface of the at least one transporting device can be raised and lowered above and below a transporting surface of the other transporting device, and
   wherein, via targeted lowering of the ends of the webs lying downstream, the front-most container in each case of the group is released individually into a separating area, and wherein the container stream is then formed into a single-track container stream by means of a short rail arranged at an obtuse angle relative to the transporting direction.

9. The method according to claim 8, further comprising:
   lifting devices, with which the height-adjustable webs can be vertically positioned, with the result that at least a portion of the webs can be raised and lowered above and below the transporting plane of the transporting apparatus.

* * * * *